United States Patent [19]

Erdman et al.

[11] Patent Number: 4,998,052

[45] Date of Patent: Mar. 5, 1991

[54] GEARLESS DIRECT DRIVE-SWITCHED RELUCTANCE MOTOR FOR LAUNDRY APPLICATION

[75] Inventors: David M. Erdman; Harold B. Harms; John L. Oldenkamp, all of Fort Wayne; Gustave F. Wiedemann, New Haven, all of Ind.

[73] Assignee: General Electric Company, Fort Wayne, Ind.

[21] Appl. No.: 386,089

[22] Filed: Jul. 28, 1989

[51] Int. Cl.⁵ .................................................. H02K 19/06
[52] U.S. Cl. ...................................... 318/701; 318/696; 68/23.7
[58] Field of Search ............... 318/138, 254, 439, 696, 318/701; 68/23.7; 310/91, 261, 262, 263, 264, 265, 266, 267, 268, 269

[56] References Cited

U.S. PATENT DOCUMENTS

| | | | |
|---|---|---|---|
| 559,910 | 5/1896 | Reist | 310/261 X |
| 674,505 | 5/1901 | Heath | 310/261 X |
| 1,901,280 | 3/1933 | Barnholdt | 310/261 |
| 4,039,908 | 8/1977 | Maeder | 318/701 |
| 4,253,634 | 3/1981 | Daniels | 310/91 X |
| 4,450,396 | 5/1984 | Thornton | 318/696 X |
| 4,473,764 | 9/1984 | White | 310/91 |
| 4,550,280 | 10/1985 | Freise | 318/701 |
| 4,595,865 | 6/1986 | Jahns | 318/138 X |
| 4,638,195 | 1/1987 | Lin | 318/696 X |
| 4,777,419 | 10/1988 | Obradovic | 318/701 X |
| 4,801,831 | 1/1989 | Lewis | 310/91 |
| 4,819,460 | 4/1989 | Obradovic | 68/23.7 |

FOREIGN PATENT DOCUMENTS 61-66557 4/1986 Japan .................................. 318/701

Primary Examiner—Bentsu Ro
Attorney, Agent, or Firm—Ralph E. Krisher, Jr.

[57] ABSTRACT

A drive system for a laundry machine utilizing a switched reluctance motor of three or more phases and with stator/rotor pole ratios selected from the ratios of 6:4 and 8:6 with the actual number of poles being a multiple of 2 or more times those numbers. A stator/rotor gap of 10-20 mils is maintained in large diameter motors and cooling for the coils and electronic components positioned within the motor is provided.

45 Claims, 9 Drawing Sheets

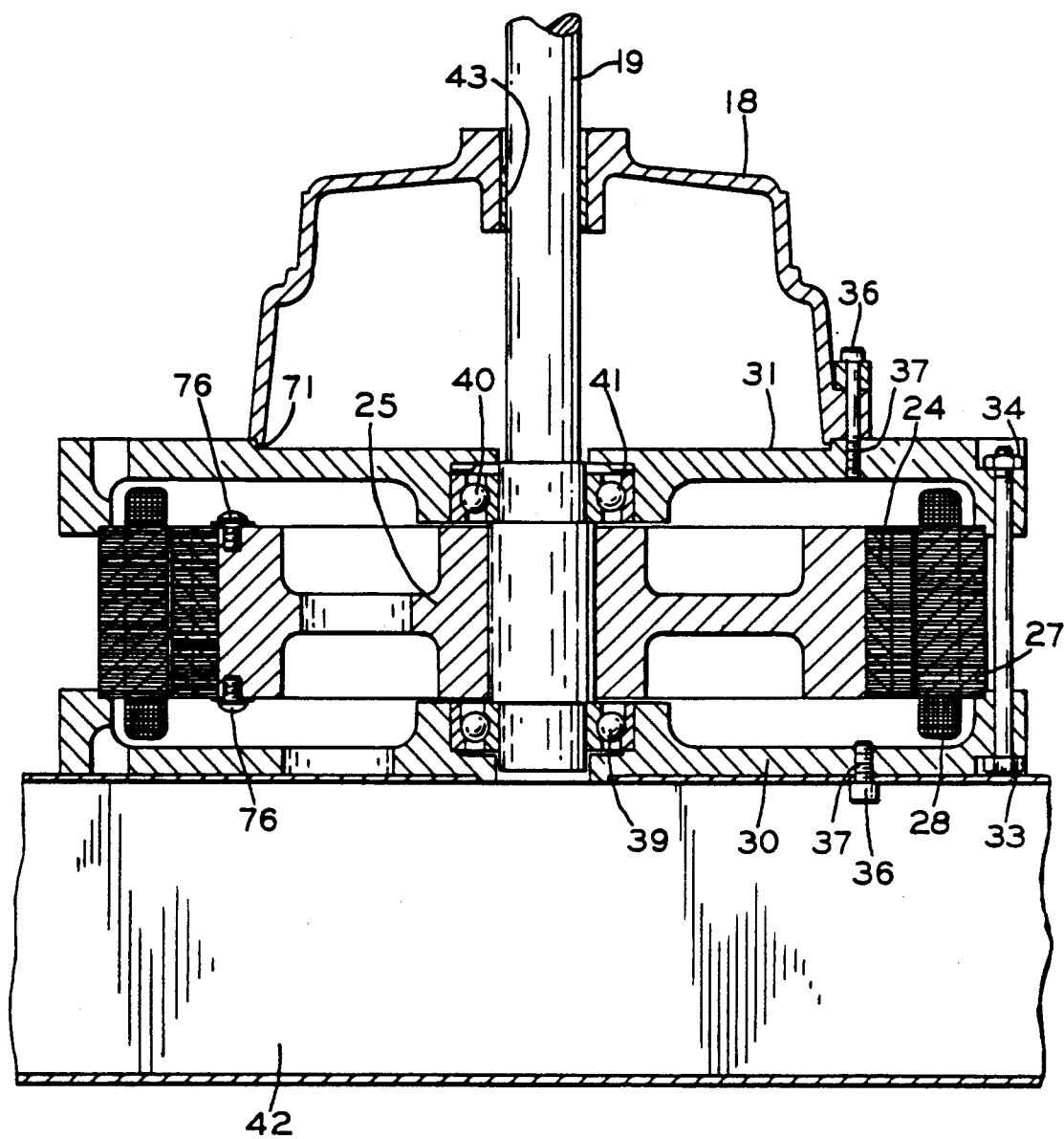
FIG_2A

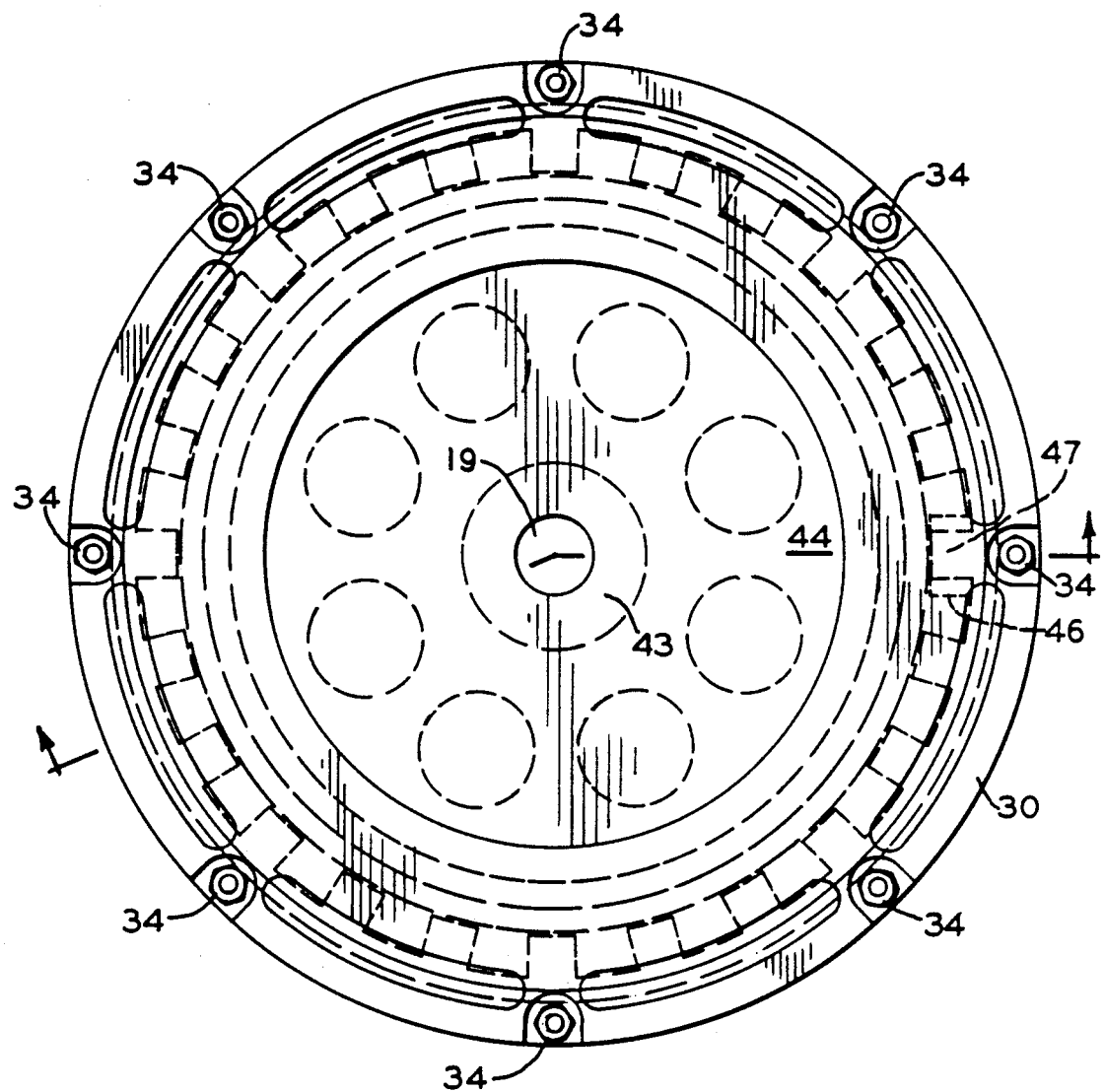
FIG_2B

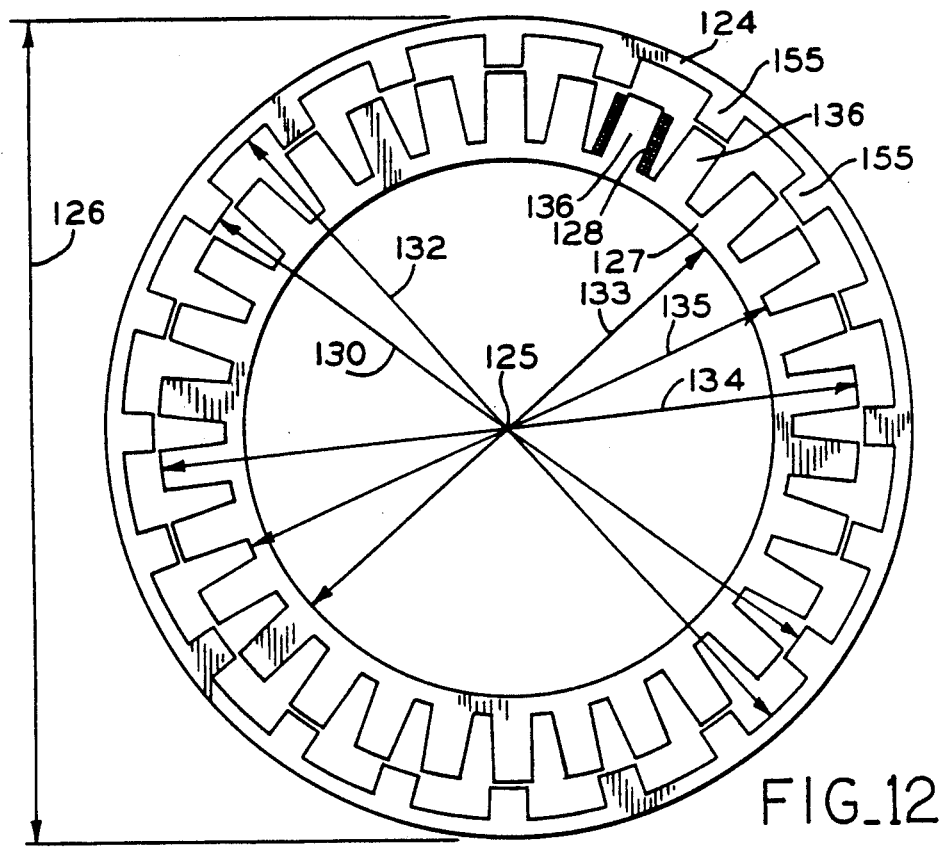
FIG_12
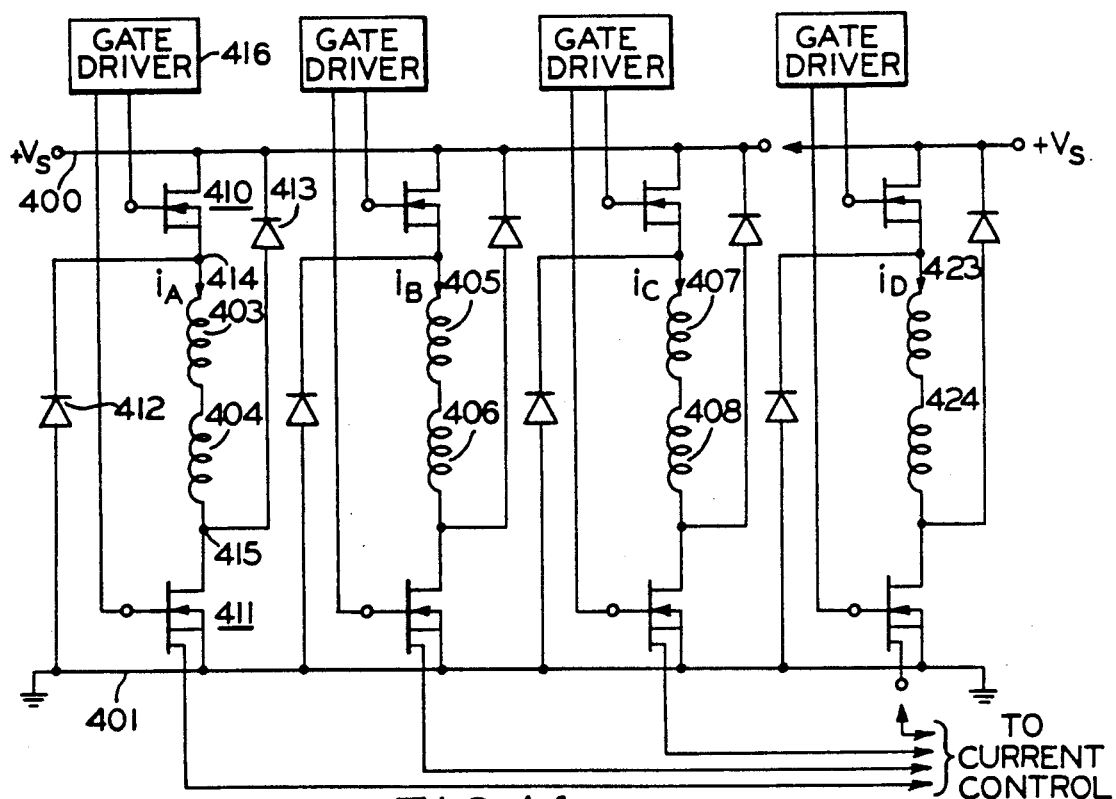
FIG_14

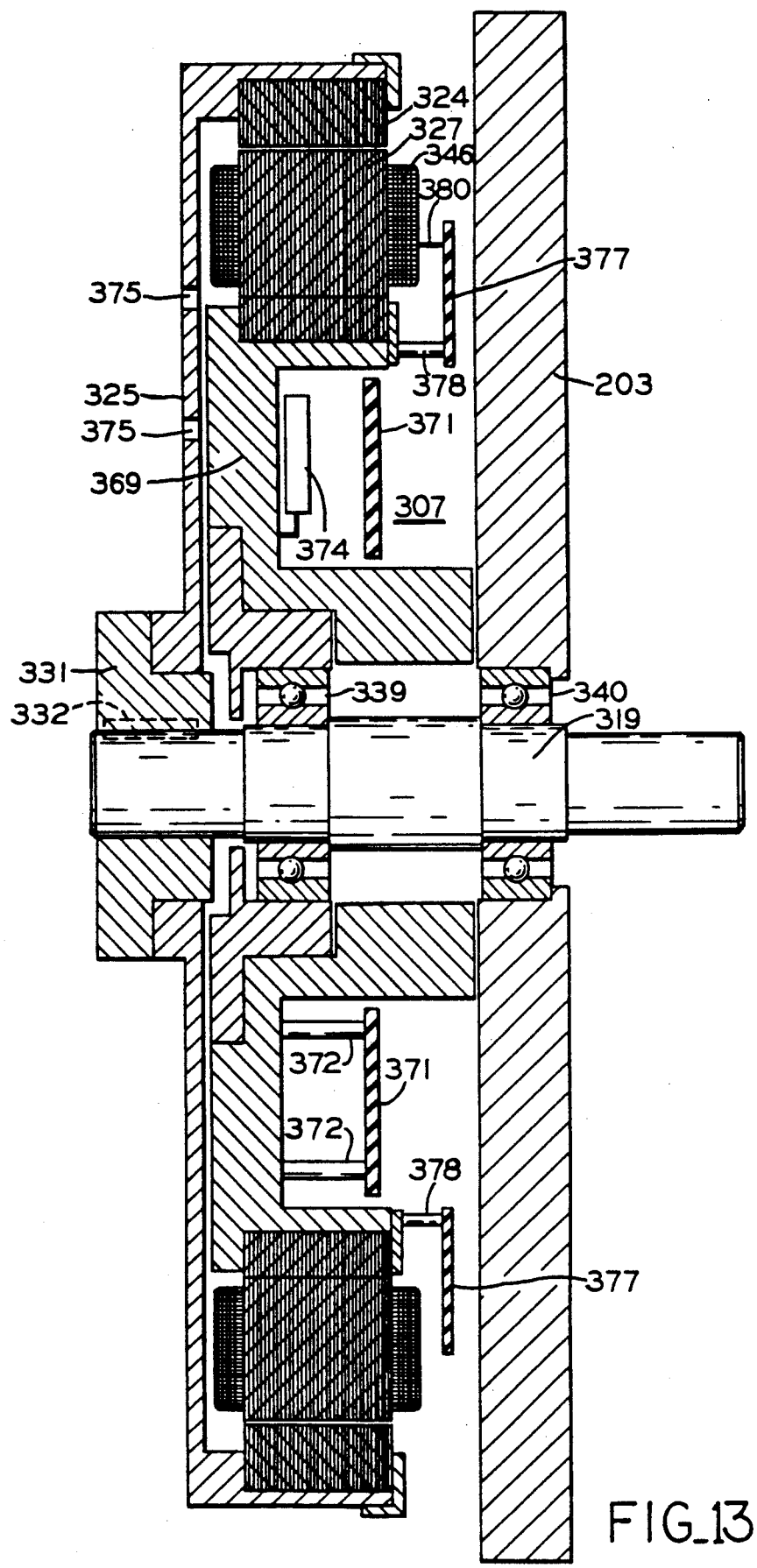
FIG_13

GEARLESS DIRECT DRIVE SWITCHED RELUCTANCE MOTOR FOR LAUNDRY APPLICATION

FIELD OF THE INVENTION

The present invention relates in general to a laundering system for operating a laundry machine by means of a switched reluctance motor which directly provides the basic motion of the rotatable laundry machine components without a geared mechanical transmission.

BACKGROUND OF THE INVENTION

Many conventional laundry machines use a complex mechanism which adapts a constant speed motor, e.g., one which runs at approximately 1800 RPM, to the comparatively slow back-and-forth motion of an agitator during a wash cycle. The same mechanism adapts the motor to a unidirectional spin cycle during which a tub rotates alone or together with the agitator, at a speed which may be in the order of 600 RPM. The physical dimensions of the motor required for such machines, as well as the dimensions of a transmission for coupling the motor to the machine, is relatively large, and may necessitate the motor being positioned a considerable distance from, and out of line with, the axis of the drive shaft of the laundry machine. This distance must be sufficiently large to accommodate an intermediate belt transmission, and related pulleys, as well as whatever gearing is required to step down the speed of the motor. In addition, a transmission clutch is provided to transition the machine from the slow agitate motion to the high unidirectional spin speed.

Such a mechanical arrangement is unbalanced necessitating special measures to restore the balance of the machine. Further, because of severe demands made on such a machine, particularly on the transmission during a reversal of direction, some of such machines may have a relatively short life. The above discussed factors tend to increase the initial cost of such machine, as well as maintenance costs.

In addition, the range of operations of conventional laundry machines is, by necessity, limited. Providing such machines with the capability of handling a larger number of different laundry conditions, such as may be presented by the variety of present day fabrics and wash loads, increases the complexity of the transmission as well as the overall cost of the machine. Thus, the capability of such conventional laundry machines represents a compromise between different expected laundry conditions, modified by cost and mechanical considerations.

It is also important to minimize the noise, vibration and pulsations of a household washing machine not only to increase the life and reliability of the machine, but also to improve the environmental impact of such disruptions.

To overcome the aforementioned shortcomings, adjustable speed drives comprising electronically commutated motors (ECMs) for use in laundering machines have been developed. One such device is disclosed in U.S. Pat. No. 4,556,827 issued Dec. 3, 1985 to David M. Erdman and assigned to the same assignee as the subject invention. The laundering apparatus of that patent includes an electronically commutated motor. Although electronically commutated motors reduce the complexity, size and cost of laundering apparatus, and minimize or overcome many of the above problems, it is desirable to reduce these factors even further. The present invention, therefore, utilizes a switched reluctance motor (SRM) drive system for operating laundering apparatus. In contrast to an ECM, an SRM requires no permanent magnets and no rotor windings.

In addition, the SRM is directly operable to cover a broad range of speed and related torques without switching or relay means to change motor connections, and may be provided with position sensing circuits that are operative down to zero speed.

A switched reluctance motor and its associated drive system including a method for indirectly estimating rotor position in an SRM drive system is disclosed in U.S. Pat. No. 4,772,839, issued Sept. 20, 1988 to S. R. MacMinn and P. B. Roemer and in copending patent application Ser. No. 07/332,205 filed by S. R. MacMinn et al on Apr. 3, 1989, both of which are assigned to the same assignee as the subject invention, and both of which are hereby incorporated by reference.

OBJECTS AND SUMMARY OF INVENTION

It is an object of the present invention to provide an improved laundry machine having a direct drive switched reluctance motor to eliminate the need for intermediate drives including mechanical transmissions, pulleys, belts and a clutch mechanism.

It is a further object of the present invention to provide an improved laundry machine having a direct drive motor which minimizes the vibration and noise during operation.

It is another object of the present invention to provide an improved laundry machine having a direct drive motor which develops high torque and is reliable in operation.

It is still another object of the present invention to provide an improved laundry machine having a direct drive motor which requires less space, is cost efficient, and provides improved washing capabilities.

It is yet another object of the present invention to provide an improved laundry machine having a direct drive motor which has improved balance in the moving parts.

In carrying out the present invention a switched reluctance variable speed motor is connected to drive a laundry machine. The motor includes a stator to rotor pole ratio selected from the ratios consisting of 6:4 and 8:6 with the actual number of poles being a multiple of 2 or more times those numbers, and the preferred multiple being in the range of 3 to 5. The coils on each of the stator poles are connected to form 3 or more phases. The air gap between the rotor and stator is in the order of 10–20 mils. End shields are provided with provisions for air cooling of the coils. In one embodiment, the rotor is outside the stator and the electronic components are positioned within the yoke supporting the stator and provisions are made to pass cooling air over the electronic components and coils including holes or spokes in the member connecting the rotor to the motor shaft, and a printed wiring board is provided within the yoke to interconnect the coils to provide the multiple phases.

BRIEF DESCRIPTION OF DRAWINGS

FIG. 2A is a cross section of a portion of the laundry machine of FIG. 1 showing the details of mounting the SRM;

FIG. 2B is a bottom view of the SRM of FIG. 2A;

FIG. 12 shows an alternate embodiment inside out rotor-stator configuration having a 30 pole stator and a 20 pole outside rotor;

FIG. 13 is an alternate mounting arrangement of the SRM within a laundry machine including details of mounting and cooling the associated electronics drive; and FIG. 14 is a simplified schematic showing a drive circuit used in connection with the present invention.

DETAILED DESCRIPTION OF THE INVENTION

Figure 1:
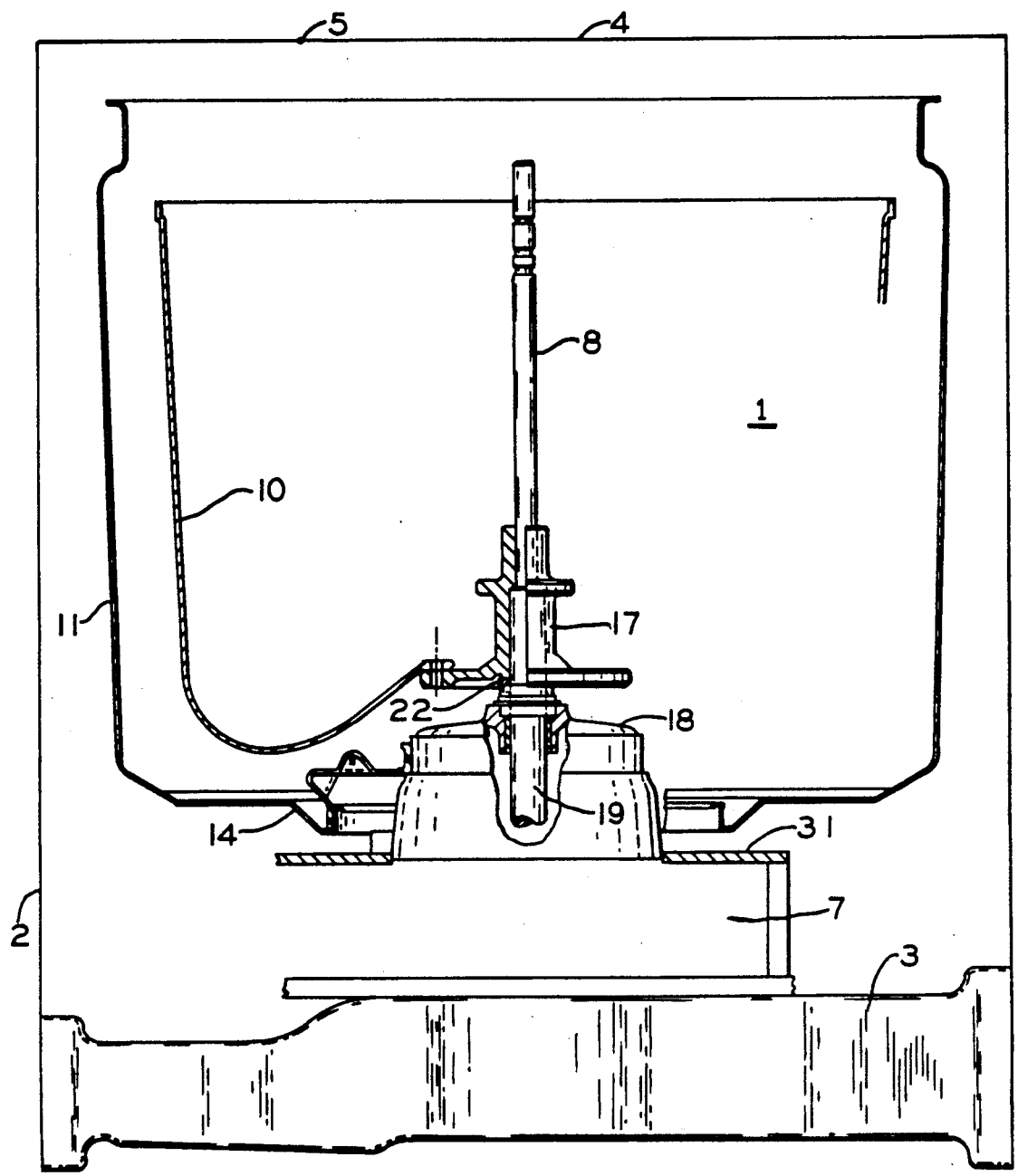
FIG. 1 is a partial cut-away section showing the SRM motor within a laundry machine in accordance with one form of the present invention.

FIG. 1 shows the SRM mounted within a laundry machine. Referring to FIG. 1, the laundry machine includes a housing or cabinet 2 including a base and suspension system 3 and a top access door 4 hinged at 5. The SRM motor 7 is supported on the suspension system 3 and is positioned below, and connected to, the central agitator shaft 8 and the oscillating inner basket 10. An outer stationary basket 11 is secured to the housing 18 through a rubber water seal 14. The clothes to be washed are inserted through the access door 4 to the inner basket 10. Water is introduced into the inner basket 10 and flows through multiple holes in the inner basket to be retained by the outer basket 11 until drained and/or recirculated. As is well known in the art, the clothes may be washed through the combined movements of the agitator (not shown) connected to the agitator shaft 8 and the oscillating inner basket 10.

The SRM shaft 19 is connected to the agitator shaft 8 and/or the inner basket 10 through coupling 17 above housing 18. A water seal 22 around coupling 17 surrounds the shaft and prevents water leakage through the coupling.

Referring next to FIGS. 2A and 2B, the SRM 7 includes a rotor 24 secured to SRM shaft 19 by rotor hub 25. The stator 27 including windings 28 are positioned and supported between the pulley end-shield 30 and the opposite pulley end end-shield 31. The end shields 30 and 31 are fastened together by hexagonal head bolts such as 33 and a nut with lockwasher 34. The end shield 31 is secured to the laundry machine 1 through the carriage 42 by socket head cap screws 36 with a Helicoil insert 37. The SRM shaft is rotatably supported within the end shields 30 and 31 by ball bearings. A wave spring washer 41 is positioned between the bearing 41 and the end shield 30. The ball bearing 39 is of the angular contact type, manufactured and sold by SKF as their 7206BY bearing, in order to absorb a thrust load. The bearing 40 is an SKF 62062RS. A sleeve bearing 43 in housing 44 provides a water tight transition between the SRM shaft 19 and the water-filled laundry machine 1.

Figure 3:
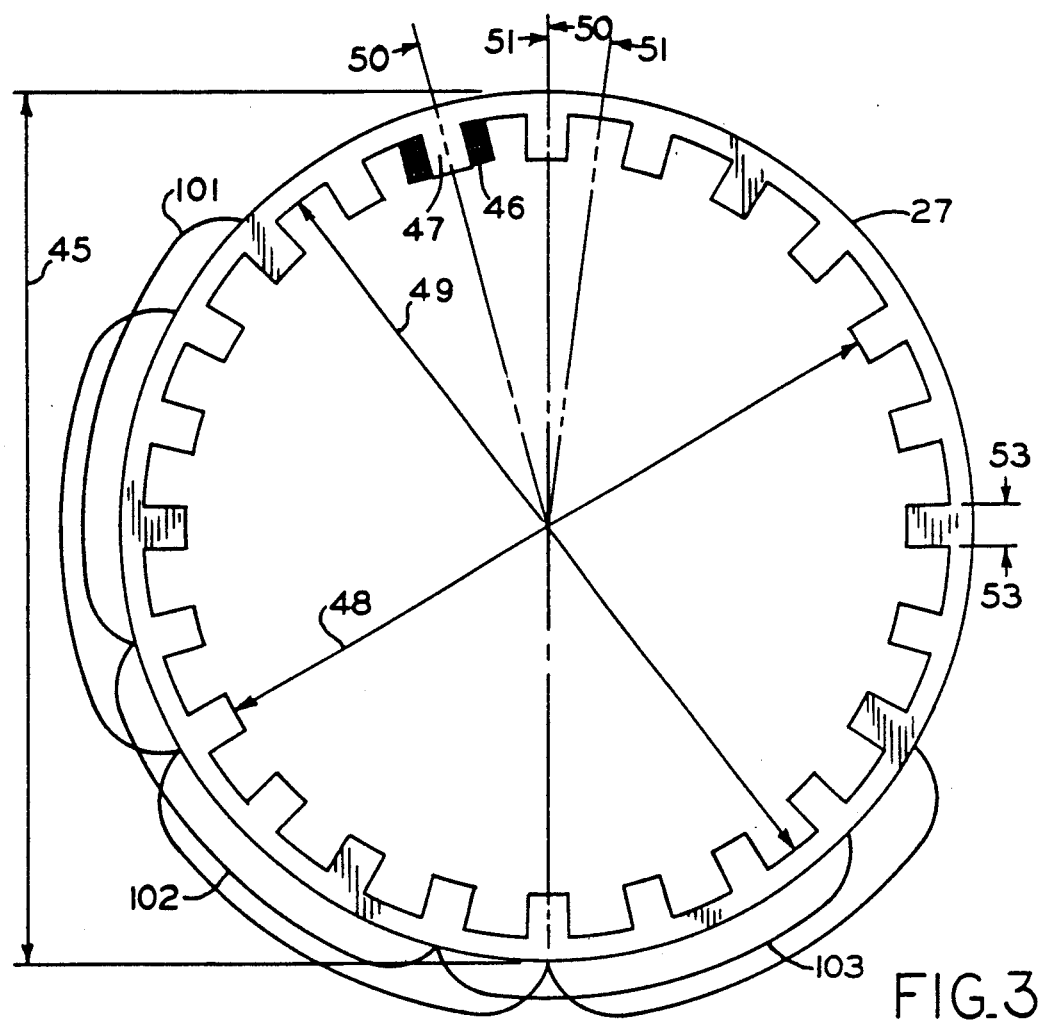
FIG. 3 shows the stator configuration in one embodiment of the SRM motor.

The stator 27 is shown in FIG. 3. Referring to FIG. 3 the stator is shown with 24 equally spaced poles 47 and has an outside diameter 45 of 11.9 inches with an inside finished diameter 48 of 10.04 inches across the inside of the teeth or poles 47. The outer edges, or roots, of the teeth have an 11.20 inch diameter 49. The stator is made up of laminations, 0.020 inches thick, formed into a stack height of 2.25 inches. The coils 46 on every fourth tooth are connected to and constitute one of the four phases. This is shown schematically by the connection 101, 102, and 103. The coils 46 are individually precision wound, inserted on the teeth and then interconnected. Each coil consisted of 110 turns of 0.032 copper wire. FIG. 3 shows only a single coil by way of example. The angle 51 between the center of a tooth 47 and the center of the adjacent root is 7 degrees 30 minutes, while the angle 51 between the center of adjacent teeth is 15 degrees 0 minutes. The width 53 of a tooth 47 is 0.5826 inches.

Figure 4:
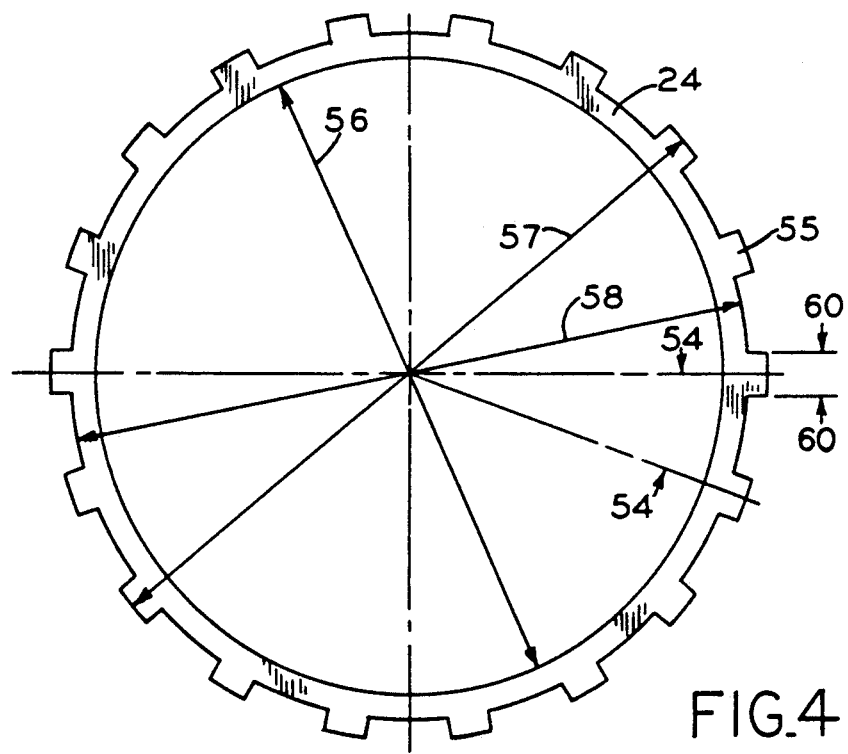
FIG. 4 shows the rotor used with the configuration of FIG. 3.

The rotor 24 is shown in FIG. 4. Referring to FIG. 4, there are 18 equally spaced teeth 55 on the rotor, spaced twenty degrees apart as shown by angle 54. The inside diameter 56 is 8.700 inches less 0.020 inches for grinding. The outside diameter 57 of the teeth 55 is 10.00 inches plus 0.020 inches for finishing while the inside diameter or root diameter 58 of the teeth is 9.4000 inches. The width 60 of the teeth 55 is 0.5826 inches. The rotor is made up of laminations 0.020 inches thick to form a stack height of 2.25 inches. The width 53 of rotor teeth 44 and width 60 of stator teeth 55 are approximately equal.

The shaft power of the SRM 7 is sensitive to air gap between the rotor and stator teeth. A preferred air gap is 0.010 inches. A larger air gap may be preferable from a production point of view because of the difficulty of holding such a small gap in such a large diameter motor. An air gap of 0.020 inches was found to be satisfactory even though this required the larger stack of laminations, namely 2.25 inches. The rotor and stator laminations were laser cut to shape. However, a desirable method of forming the rotor and stator laminations in order to avoid the effort and cost of punching and stacking the laminations is to utilize edgewise winding as disclosed in U.S. Pat. Nos. 4,613,780, issued Sept. 23, 1986 to H. L. Fritzsche, and 4,622,835 issued Nov. 18, 1986 to D. K. Bisson and H. L. Fritzsche, both of which are assigned to the same assignee as the subject invention, and which are incorporated herein by reference.

Figure 5:
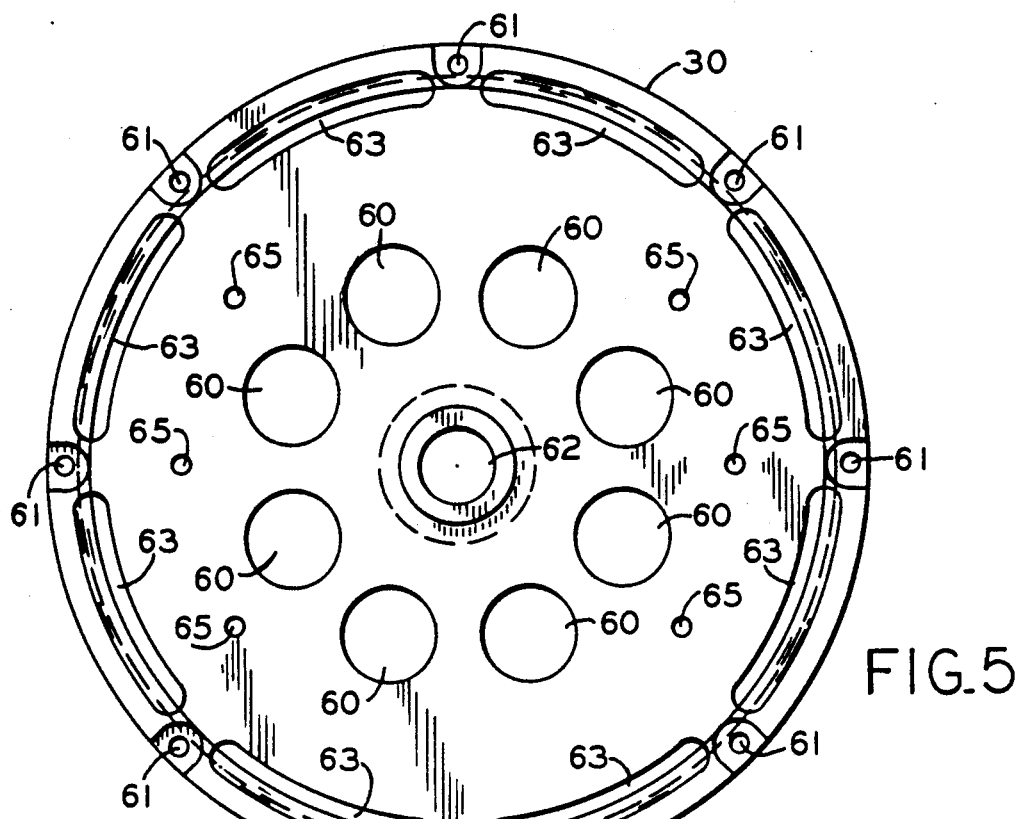
FIG. 5 shows one of the end shields for the SRM of FIG. 3.
Figure 6:
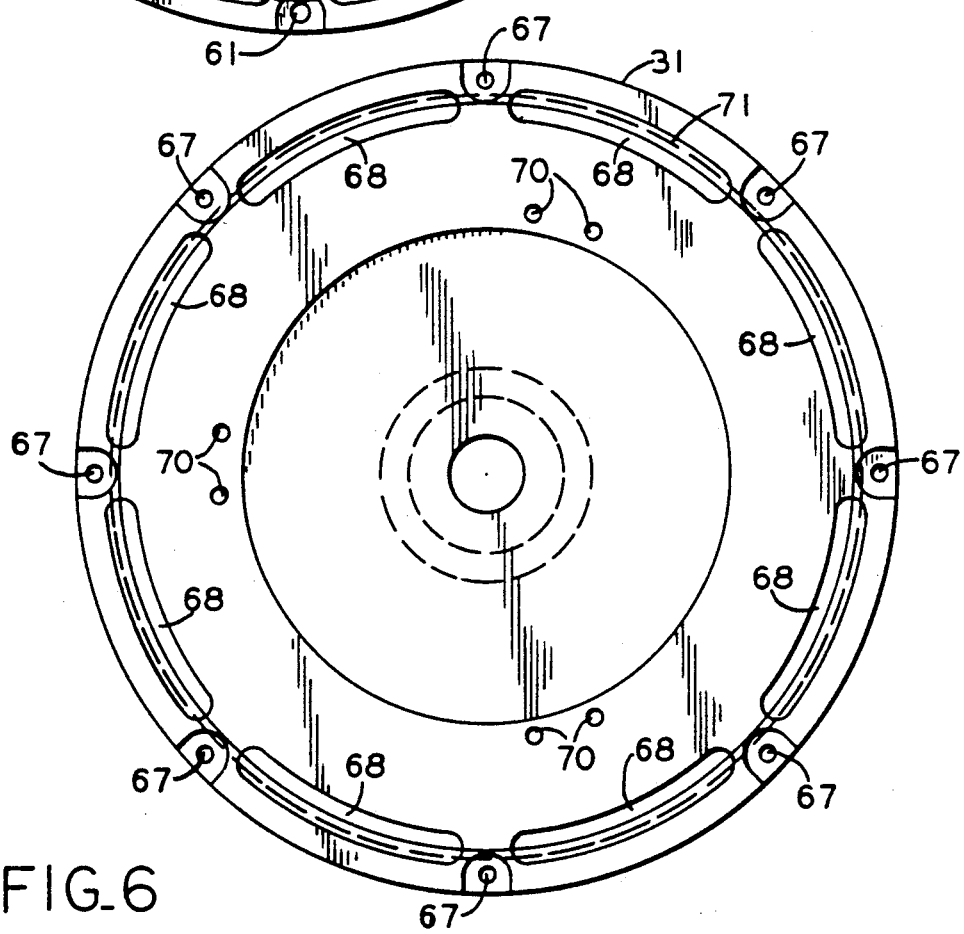
FIG. 6 shows the other end shield for the SRM of FIG. 3.

The end shields 30 and 31 are shown in FIGS. 5 and 6. Referring first to FIG. 5, the opposite-pulley end shield 30, that is the lower end shield furthest from the laundry baskets 10 and 11, includes eight equally spaced large holes 60 one and one-half inches in diameter, prominently placed and equally spaced about the mid-region of the end shield to promote the flow of cooling air across the stator coils 28. Eight equally spaced holes 61 about the periphery of the end shield 30 accommodate the hexagonal bolts 33 to secure the end shield in place on the SRM 7. A central aperture 62 accommodates the passage of SRM shaft 19. Eight elongated arcuate slots 63 located between the holes 61 and adjacent the periphery of the end shield also provide for the flow of cooling air. Six drilled and tapped holes 65, three on either side, are provided to accommodate the Helicoil wire thread coil inserts 37 (shown in FIG. 2A) which provide resilient attachment to, and mounting for, stator 27. The end shield 30, is fabricated from aluminum.

Referring next to FIG. 6, the end shield 31, like end shield 30, includes eight holes 67 for bolts 33 equally spaced about the periphery, and eight elongated arcuate slots 68 between the holes 67 and adjacent the periphery of the end shield to promote the flow of cooling air through the SRM 7 and over the stator coils 28. Like the end shield 30, the end shield 31 is fabricated from aluminum. Six holes 70 are drilled and tapped for Helicoil inserts 37 (not shown) to provide resilient attachment to, and mounting for, stator 27. The end shield 31 includes a 7.6885 inch diameter rabbet 71 for the machined housing 18 to fit into (also see FIG. 2A).

Figure 7:
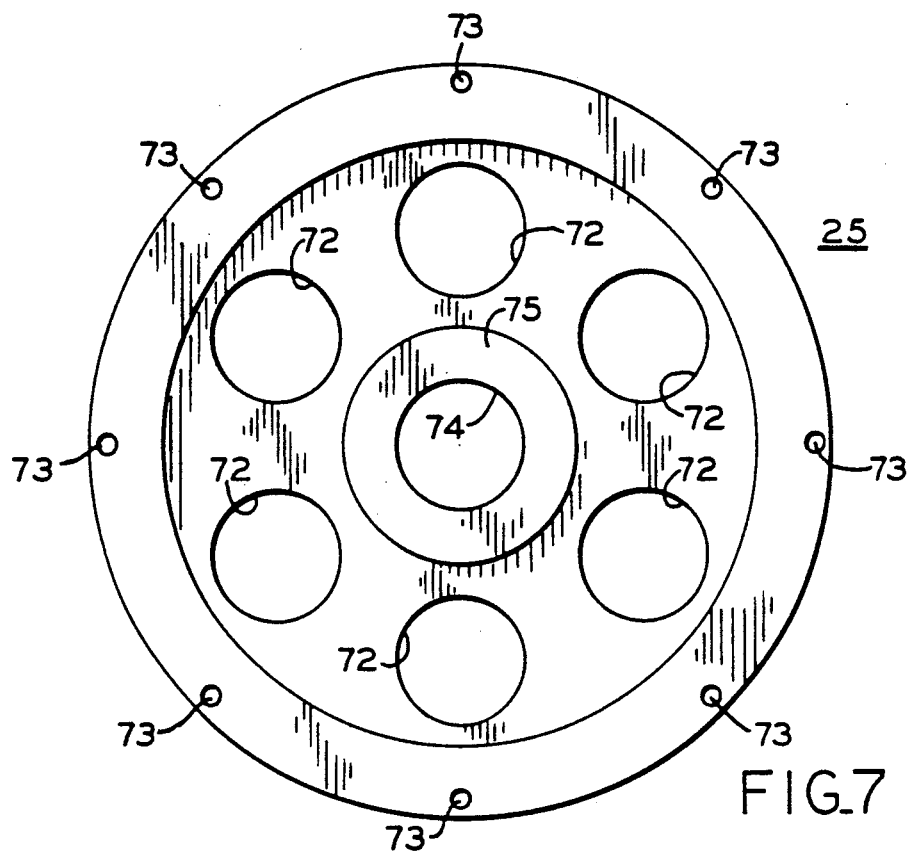
FIG. 7 shows the rotor hub used in the SRM.

The rotor hub 25 is shown in FIGS. 2A and 7. Referring to FIGS. 2A and 7, the rotor hub includes six large holes 72, one and one-half inches in diameter, equally spaced about the mid-region of the rotor hub to allow the cooling air flow to exit the SRM 7. Eight equally spaced holes 73 are drilled and tapped into each side of the outer flange portion 77 of the rotor hub 25 for capscrews and washers 76 which secure the rotor laminations 24 against axial displacement. The central flange 75 with its central bore 74 provides a press fit around the SRM shaft, and the outside diameter provides a shrink fit into the inside diameter 56 of the rotor 24 for rotation with the rotor. The rotor hub 25 is machined from aluminum to keep its contribution to rotational inertia as low as possible.

Figure 8:
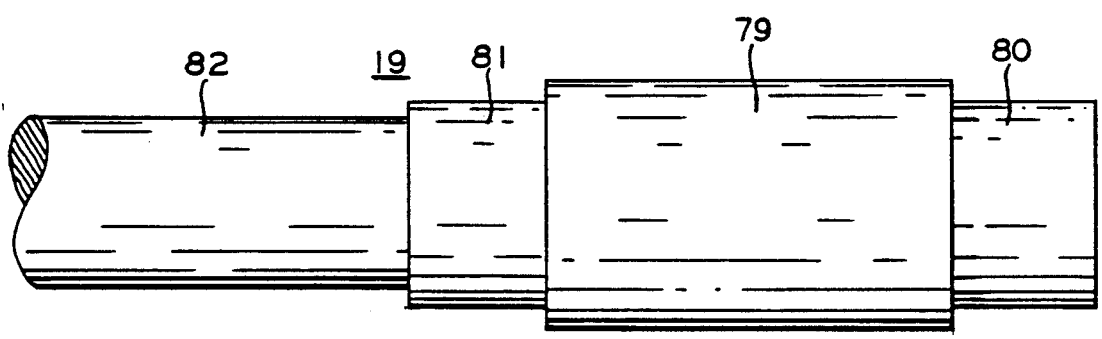
FIG. 8 shows the motor shaft of the SRM.

The SRM motor shaft 19 is shown in FIG. 8. Referring to FIG. 8, the SRM shaft 19 includes a rotor hub portion 79 about which the central flange 74 of the rotor hub 25 is press fitted, a bearing support portion 80 remote from the laundry baskets 10 and 11, and a similar bearing support portion 81 on the other side of the rotor hub portion 79. The drive portion 82 connects the shaft to the laundry basket 10 to impart rotation to the laundry basket. The SRM shaft 19 is fabricated of type 416 stainless steel. The diameter of the rotor hub portion 79 is 1.4500 inches, the diameter of the bearing support portions 80 and 81 is 1.1816 inches and the diameter of the drive portion is 0.9990 inches. The diameters and material are designed to handle the 55 Newton Meters (650 ounce-feet) of wash load torque without metal fatigue.

Figure 9:
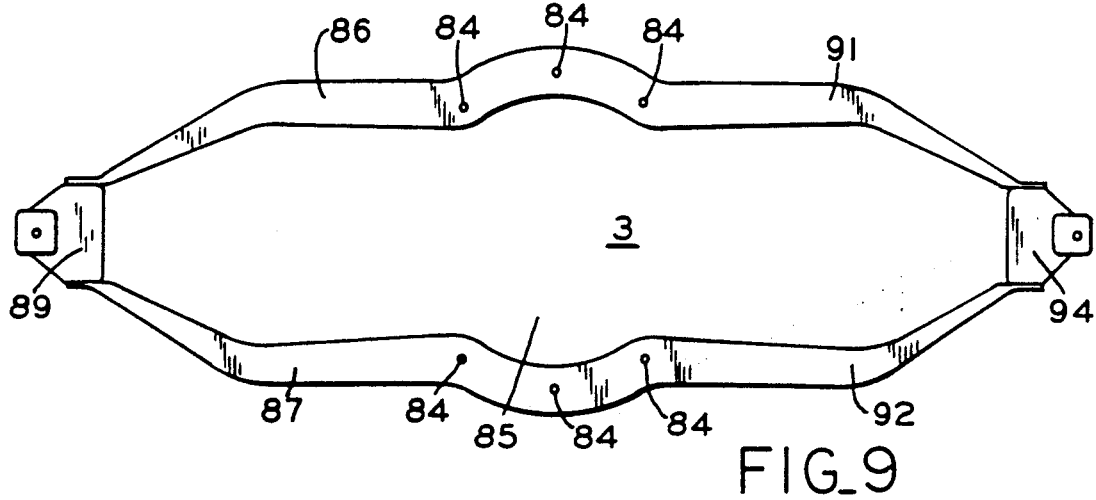
FIG. 9 shows the suspension system carriage for the SRM.
Figure 10:
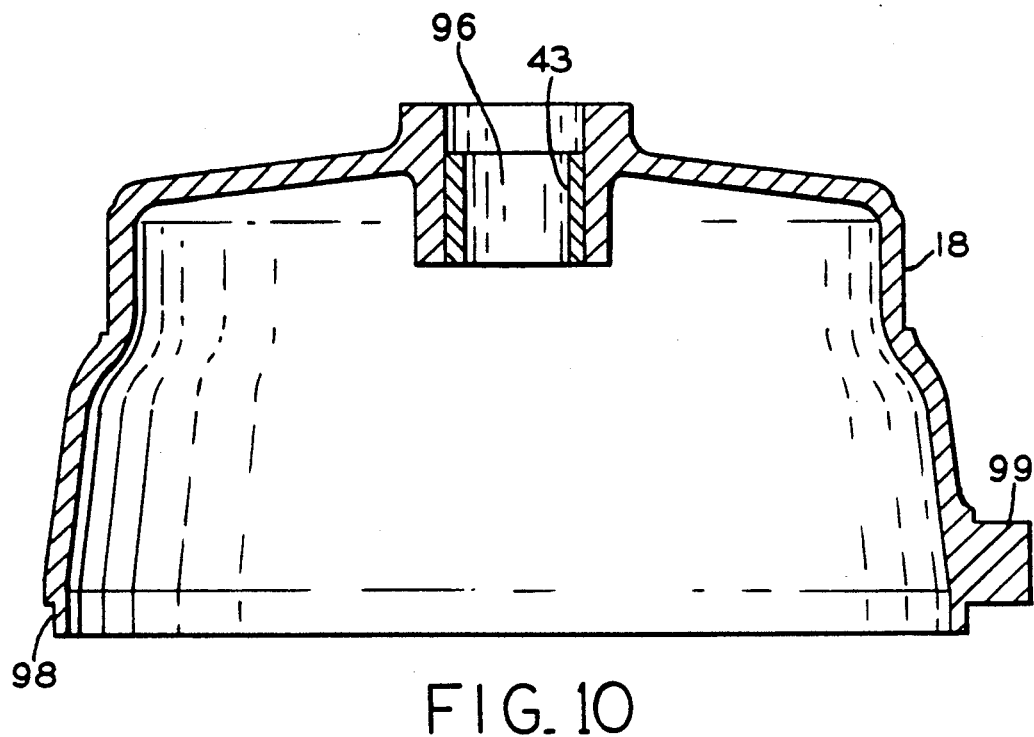
FIG. 10 shows the transmission housing for use with the SRM.

FIG. 9 shows the suspension system carriage of the base and suspension system 3 shown in FIG. 1. Referring to FIGS. 1 and 9, the suspension system carriage 3 includes a central portion 85 having a generally circular cross section and adapted to support the SRM 7. There are three 9/32 inch diameter through holes 84 on opposite sides of the central portion 85 spaced thirty-six degrees apart which match the six drilled and tapped holes 65 in the end shield 30 (best shown in FIG. 5) and the cap screws 36 and Helicoil inserts 37 (best shown in FIG. 2A). This secures the SRM 7 to the suspension system. The suspension system carriage 3 also includes two radial extending arms 86 and 87 which converge to the frame member 89 to which the cabinet 2 of the laundry machine 1 is secured. Radially extending arms 91 and 92 extend in the opposite direction from central portion 85 to converge to the frame support member 94 to which the cabinet 2 of the laundry machine 1 is also secured.

The transmission housing 18 is shown in FIGS. 1, 2A, 2B and 10. Referring to FIGS. 1, 2A, 2B and 10, the transmission housing 18 transitions the SRM 7 to the upper parts of the laundry machine 1. It is generally bell shaped in configuration and includes a central bore 96 including an internal sleeve bearing 43 through which the SRM shaft 19 passes. The upper end of housing 18 includes a stepped side portion 98 which fits within a central recess in pulley-end end shield 31. Three equally-spaced tabs 99 extend radially outward at the open end of the housing 18.

Figure 11A:
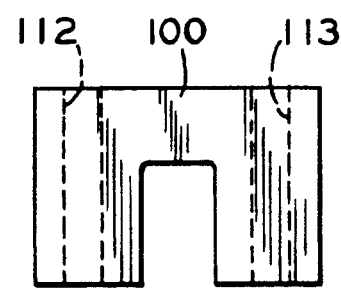
FIGS. 11A and 11B show the lug which clamps the transmission housing to the pulley end shield.
Figure 11B:
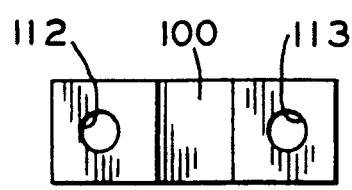

The transmission housing 18 is clamped in three places to the pulley-end end shield 30 through clamps 100 which are shown in FIGS. 2A and 11. Referring to FIGS. 2A and 11, the clamps 100 are generally U-shaped to straddle the tabs 99 on the transmission housing and clamp the housing to the end shield 31. A pair of holes 112 and 113 allow the socket head cap screws and associated Helicoil inserts 37 to pass through for screwing into the threaded holes 70 in the end shield 31.

The embodiment for rotor 24 and stator 27 of FIGS. 3 and 4 comprise a four phase SRM with 18 and 24 poles respectively. An alternate embodiment is shown in FIG. 12. FIG. 12 shows a three phase SRM with 20 and 30 poles respectively, and with the SRM 7 inside out, that is with the rotor surrounding the stator. FIG. 12 shows the rotor 124 surrounding the stator 127. Referring to FIG. 12, it is to be noted that the rotor has 20 teeth, each eighteen degrees apart with the teeth 155 facing inward toward the center of rotation 125. The outer cylindrical diameter 126 is 9.6600 inches, while the inside diameter 130 is 8.4400 inches, and the root diameter 132 is 9.2240 inches. The stator 127 has an internal diameter 133 of 6.3200 inches, an external diameter 134 of 8.4200 inches, and a root diameter 135 of 6.7560 inches. The clearance between the inside of the rotor 124 and the outside of the stator 127 is thus equal to 8.4400–8.4200 inches or 0.020 inches. The coils 128 are similar to the embodiment described above, separately wound, and placed on the teeth 136 of the stator 127. Every third coil is connected together in series to form a three phase motor.

An example of the connections for the stator of FIG. 3 is shown by the serial connection 101, 102 and 103 for a first phase and the serial connection 104, 105 and 106 for an adjacent phase, each connection skips three pole pieces to connect to the coil 28 at each fourth tooth. The three phase winding for the stator in FIG. 11 would skip two teeth and connect the coils 128 at every third tooth.

FIG. 13 shows an alternate mounting embodiment useful in constructing the subject invention, and useful in illustrating the positioning and cooling of the electronic circuitry within the SRM 7. Referring to FIG. 13, the stator 327 carrying coils such as 346 is surrounded by the external rotor 324, that is the SRM 307 is inside out with the outer member 324 rotating. The stator is secured to the base 203 of the laundry machine through yoke 369. The external rotor 324 is connected to the SRM shaft 319 by rotor hub or shaft adapter 325, and through end shield 331 which is secured to SRM shaft 19 by shaft key 332 for rotation therewith. The annular ring shaped printed wiring board 371 is secured to and spaced from the yoke 369 by posts 372. The printed wiring board 371 includes electronic connections and circuitry and along with the power hybrid package 374 comprises the SRM drive electronics described in more detail below in connection with FIG.

13. The yoke 369 includes a serrated surface in the region of the power hybrid package 374 and acts as a heat sink which is aided in cooling by the rotating shaft adapter 325 which includes a uniform distribution of openings or holes such as 375. Alternatively, the shaft adaptor or yoke 369 may include radially extending spokes to provide openings therebetween. A coil interconnect printed wiring board 377 is supported and spaced from the yoke 369 by supports 378. Leads such as 380 connect each coil 346 to the coil interconnect printed wiring board 377 where the serial connection of the coil associated with every third stator pole is made.

While the mounting and cooling of the electronic circuitry has been illustrated in connection with FIG. 12 and a three phase system, it could in essence also be utilized in connection with the four phase SRM 7 of FIGS. 2A to 11.

The electronic drive circuitry is shown in FIG. 14. Referring to FIG. 14, an SRM drive circuit includes a power supply connected between $+V_s$ 400 and ground 401. A separate identical drive circuit is provided for each phase, represented by series connected coils 403, 404; 405, 406; 407, 408 and if a fourth phase is included in the motor such as the SRM shown in FIGS. 2A to 11, a fourth set of windings 423, 424 is included. Since each of the drive circuits for each phase is identical only that for a single phase will be described. The windings 403 and 404 are connected across the power source 400, 401 through field effect transistors (FET's) 410 and 411. Flyback or return diodes 412 and 413 connect the junctions 414 and 415 respectively between the coils and the FETs to ground and $+V_s$, respectively, and a gate driver 416 ensures proper gating.

For a detailed description of the operation of such drive circuitry and related position signal generation, reference is made to the above referenced copending patent application Ser. No. 07/332,205. By way of brief summary, torque is produced by switching current in each phase winding such as 403 and 404 in a predetermined sequence that is synchronized with angular position of the rotor 24, or 324, so that a magnetic force of attraction results between the rotor poles and stator poles that are approaching each other. The current is quenched in each phase before the rotor poles nearest the stator poles of that phase rotate past the aligned position; otherwise, the magnetic force of attraction would produce a negative or braking torque. The torque developed is independent of the direction of current flow, so that unidirectional current pulses synchronized with rotor movement can be applied to the stator phase windings by a converter using unidirectional current switching elements, such as thyristors or transistors.

In operation, the multi-phase, many poled motors described above proved to be unexpectedly quiet. Contributing to this, it is believed, were the 0.020 inch air gap, a wide stator yoke, and keeping peak magnetic flux in the iron well below saturation, particularly in the "field weakened" laundry spin operating mode. Torque, power output, and efficiency design goals measured as a function of SRM 7 motor current were either realized or exceeded. The 24 pole stator, 18 pole rotor, four phase SRM proved to be well suited for laundry applications at the speeds and loads required for such applications, as did the 30 pole stator, 20 pole rotor, three phase SRM. It is to be noted that the pole ratios of 8:6 and 6:4 with the actual number of poles being a multiple of those numbers have proven adequate for multi-phase machines with the large numbers of poles. Large numbers of poles with stators having twelve or more poles, can also provide superior performance. The larger number of poles minimizes the effects of torque pulsations providing decreased vibration and increased torque.

The SRM covered the broad range of speeds required without supportive means such as relays to change connections for higher speeds and torques encountered in laundry machines. Since the SRM uses no permanent magnets, its cost is lower than conventional motor drives.

While the preferred embodiments of the present invention have been shown and described herein, such embodiments are provided by way of example only. Numerous variations, changes and substitutions, including those discussed above, will occur to those skilled in the art without departing from the scope of the present invention and the following claims.

What we claim is:

1. A drive for a laundry machine comprising;
   a power source;
   a variable speed switched reluctance electric motor for agitating the water and fabrics to be laundered and to thereafter spin the fabrics to provide centrifugal displacement of water from the fabrics, the drive comprising:
   said motor having a stator and rotor, each of which includes a plurality of poles with the stator to rotor pole ratio being selected from the ratios consisting of 6:4 and 8:6 with the actual number of poles being a multiple of 3 or more times those numbers;
   coils associated with each of said stator poles wherein every third or more of said coils are connected to form 3 or more phases for the energization of said switched reluctance motor; and
   the rotor of said switched reluctance motor is drivingly connected to said laundry machine.

2. A drive for a laundry machine in accordance with claim 1 wherein said multiple is in the range of 3 to 5.

3. A drive for a laundry machine in accordance with claim 2 wherein the diameter of said stator is in the order of 12 inches and the diameter of said rotor is in the order of 10 inches.

4. A drive for a laundry machine in accordance with claim 3 wherein said switched reluctance motor is positioned below the oscillating inner basket of said laundry machine and includes at least two roller bearings surrounding the rotatable shaft of said switched reluctance motor and positioned on opposite sides of said rotor, said bearing remote from said oscillating inner basket being of the angular contact type to absorb thrust loading.

5. A drive for a laundry machine in accordance with claim 4 wherein a bell-shaped housing surrounds said rotatable shaft in the region between said switched reluctance motor and said inner basket, the open end of said housing being secured to the end shield closest to said inner basket, said housing having an internal sleeve bearing at the other end of said housing to position and rotatably support said rotatable shaft.

6. A drive for a laundry machine in accordance with claim 2 wherein said stator has at least 30 poles and said rotor has at least 20 poles and every third or more of said coils are connected to form a motor with at least 3 phases.

7. A drive for a laundry machine in accordance with claim 2 wherein said stator is positioned around said rotor.

8. A drive for a laundry machine in accordance with claim 7 wherein the gap between the inside of said stator and the outside of said rotor is in the order of 0.010 to 0.020 inches.

9. A drive for a laundry machine in accordance with claim 7 wherein said rotor is rigidly secured to the rotatable shaft of said switched reluctance motor through a rotor hub.

10. A drive for a laundry machine in accordance with claim 9 wherein said rotor hub includes openings therethrough to facilitate the passage of cooling air past said coils to the outside of said rotor hub remote from said coils.

11. A drive for a laundry machine in accordance with claim 10 wherein said rotor hub is aluminum and is dimensioned to provide an interference fit with the inside of said rotor and with the shaft of said switched reluctance motor.

12. A drive for a laundry machine in accordance with claim 2 wherein said stator has at least 24 poles and said rotor has at least 18 poles and every fourth or more of said coils are connected in series to form a motor with at least 4 phases, and the diameter of said rotor is in the order of 10 inches and the diameter of said stator is in the order of eight and one-half inches.

13. A drive for a laundry machine in accordance with claim 1 wherein said stator has at least 18 poles and said rotor has at least 12 poles and every fourth or more of said coils are connected in series to form a motor with at least 4 phases.

14. A drive for a laundry machine in accordance with claim 1 wherein said rotor is positioned around and rotates around the outside of said stator, remote from the axis of rotation of said switched reluctance motor.

15. A drive for a laundry machine in accordance with claim 14 wherein the gap between the outside of said stator and the inside of said rotor is in the order of 0.010 to 0.020 inches.

16. A drive for a laundry machine in accordance with claim 1 wherein substantially circular end shields are secured to said stator about the ends of said stator and said rotor and transverse to the connection to said drive shaft for said laundry machine.

17. A drive for a laundry machine in accordance with claim 16 wherein the shaft of said switched reluctance motor passes through the central region of said end shields, the stator of said switched reluctance motor being supported by and between said end shields.

18. A drive for a laundry machine in accordance with claim 17 wherein said end shield include multiple openings to enable the flow of cooling air therethrough and past said coils.

19. A drive for a laundry machine in accordance with claim 18 wherein said end shields are aluminum.

20. A drive for a laundry machine in accordance with claim 19 wherein said end shields are secured to said stator by fasteners including wire coil inserts.

21. A drive for a laundry machine in accordance with claim 20 wherein said end shields are bolted together.

22. A drive for a laundry machine in accordance with claim 1 wherein said stator has 24 poles, said rotor has 18 poles, and said coils are connected to form 4 phases.

23. A drive for a laundry machine in accordance with claim 1 wherein the width of said stator poles and the width of said rotor poles at the surfaces remote from their roots are equal.

24. A drive for a laundry machine comprising:
a power source;
a variable speed switched reluctance electric motor for agitating the water and fabrics to be laundered and to thereafter spin the fabrics to provide centrifugal displacement of water from the fabrics, the drive comprising:
said motor having a stator and rotor, each of which includes a plurality of poles with the stator to rotor pole ratio being selected from the ratios consisting of 6:4 and 8:6 with the actual number of poles being a multiple of 3 or more times those numbers;
coils associated with said stator poles and connected to form 3 or more phases; and
a rotatably mounted shaft connected to said rotor to drive a means to agitate and spin the fabrics in the laundry machine;
said rotor being positioned outside said stator for rotation around said stator.

25. A drive for a laundry machine in accordance with claim 24 wherein said stator is secured to said laundry machine through a yoke assembly, said yoke assembly including a cavity between the poles of said stator and said rotatably mounted shaft, and at least some of the electronic components for the drive being positioned within said cavity.

26. A drive for a laundry machine in accordance with claim 25 wherein said yoke assembly is serrated in the region of said electronic components to facilitate the flow of cooling air past said electronic components.

27. A drive for a laundry machine in accordance with claim 26 wherein said rotor is secured to said rotatably mounted shaft by a shaft adapter positioned adjacent the side of said yoke assembly which is opposite said electronic components.

28. A drive for a laundry machine in accordance with claim 27 wherein said shaft adapter rotates with said rotor and includes a plurality of openings therein to facilitate cooling air flow past said electronic components.

29. A drive for a laundry machine in accordance with claim 28 wherein a printed wiring board of generally annular shape is positioned adjacent said coils, said coils are connected to said printed wiring board, and said three or more phases are formed by the interconnection of said coils by said printed wiring board.

30. A drive for a laundry machine in accordance with claim 29 wherein another printed wiring board of generally annular shape is positioned around said rotatably mounted shaft and within said cavity.

31. A drive for a laundry machine in accordance with claim 24 wherein said stator has 30 poles, said rotor has 20 poles, and said coils are connected to form 3 phases.

32. A drive for a laundry machine in accordance with claim 24 wherein said multiple is in the range of 3 to 5.

33. A drive for a laundry machine comprising:
a power source;
a variable speed switched reluctance electric motor for agitating the water and fabrics to be laundered and to thereafter spin the fabrics to provide centrifugal displacement of water from the fabrics, the drive comprising:
said motor having a stator and rotor, each of which includes a plurality of poles with the stator to rotor pole ratio being selected from the ratios consisting of 6:4 and 8:6 with the actual number of poles being a multiple of 3 or more times those numbers;
coils associated with said stator poles and connected to form 3 or more phases;

driving means connected to said rotor to agitate and spin the fabrics in the laundry machine;

said power source including a current switching device connected in circuit with each of said phases, the current switching devices being switched in a predetermined sequence response to the angular position of said rotor.

34. A drive for a laundry machine in accordance with claim 33 wherein said multiple is in the range of 3 to 5.

35. A drive for a laundry machine in accordance with claim 34 wherein said stator is positioned around said rotor.

36. A drive for a laundry machine in accordance with claim 35 wherein the gap between the inside of said stator and the outside of said rotor is in the order of 0.010 to 0.020 inches.

37. A drive for a laundry machine in accordance with claim 33 wherein said stator has at least 18 poles and said rotor has at least 12 poles and every fourth or more of said coils are connected in series to form a motor with at least 4 phases.

38. A drive for a laundry machine in accordance with claim 33 wherein said rotor is positioned around and rotates around the outside of said stator, remote from the axis of rotation of said switched reluctance motor.

39. A drive for a laundry machine in accordance with claim 38 wherein the gap between the outside of said stator and the inside of said rotor is in the order to 0.010 to 0.020 inches.

40. A drive for a laundry machine in accordance with claim 33 wherein said switched reluctance motor includes a rotor hub surrounding a shaft and said rotor hub is dimensioned to provide an interference fit with the inside of said rotor and with said shaft.

41. A drive for a laundry machine in accordance with claim 40 wherein said rotor hub includes openings therethrough to facilitate the passage of cooling air past said coils to the outside of said rotor hub remote from said coils.

42. A drive for a laundry machine in accordance with claim 33 wherein the diameter of said stator is in the order of 12 inches and the diameter of said rotor is in the order of 10 inches.

43. A drive for a laundry machine in accordance with claim 33 wherein the diameter of said rotor is in the order of 10 inches and the diameter of said stator is in the order of eight and one-half inches.

44. A drive for a laundry machine in accordance with claim 33 wherein said stator has 30 poles, said rotor has 20 poles, and said coils are connected to form 3 phases.

45. A drive for a laundry machine in accordance with claim 33 wherein said stator has 24 poles, said rotor has 18 poles, and said coils are connected to form 4 phases.

* * * * *